(12) United States Patent
Beikmann

(10) Patent No.: US 9,416,743 B2
(45) Date of Patent: Aug. 16, 2016

(54) CYLINDER ACTIVATION/DEACTIVATION SEQUENCE CONTROL SYSTEMS AND METHODS

(71) Applicant: GM Global Technology Operations LLC, Detroit, MI (US)

(72) Inventor: Randall S. Beikmann, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 107 days.

(21) Appl. No.: 13/799,181

(22) Filed: Mar. 13, 2013

(65) Prior Publication Data

US 2014/0090623 A1    Apr. 3, 2014

Related U.S. Application Data

(60) Provisional application No. 61/709,194, filed on Oct. 3, 2012.

(51) Int. Cl.
    *F02D 41/00*      (2006.01)
    *F02D 13/06*      (2006.01)
    (Continued)

(52) U.S. Cl.
    CPC ............ *F02D 41/0087* (2013.01); *F02D 13/06* (2013.01); *F02D 11/105* (2013.01);
    (Continued)

(58) Field of Classification Search
CPC .............. F02D 41/008; F02D 41/0082; F02D 41/0085; F02D 41/0087; F02D 17/00; F02D 17/02; F02D 13/06; F02D 2250/18; F02D 37/02; F02D 2041/0012; F02D 2041/001; F02D 2200/602; F02D 41/0002; F02D 2250/28; F02D 2200/1004; F02D 41/2422; F02D 41/307; F02D 13/0203; F02D 2041/1412; F01L 2013/001; F01L 13/0005; F01L 2800/00; F01L 1/34; F01L 2800/08; Y02T 10/18; Y02T 10/42; Y02T 10/123; F02P 5/1512; F02P 5/1522; F01N 2430/02; B60Y 2300/435

USPC ........... 123/198 F, 481, 406.23, 198 DB, 348, 123/406.2; 701/102, 103, 54, 101, 53, 58, 701/105
See application file for complete search history.

(56) References Cited

U.S. PATENT DOCUMENTS 3,596,640 A    8/1971   Bloomfield
4,129,034 A    12/1978   Niles et al.
(Continued)

FOREIGN PATENT DOCUMENTS

CN      1573916 A    2/2005
CN      1888407 A    1/2007
(Continued)

OTHER PUBLICATIONS

U.S. Appl. No. 14/548,501, filed Nov. 20, 2014, Beikmann et al.
(Continued)

*Primary Examiner* — Hung Q Nguyen
*Assistant Examiner* — John Bailey

(57) ABSTRACT

A target cylinder count module determines a target number of cylinders of an engine to be activated during a future period. The future period includes N sub-periods, and N is an integer greater than one. Based on the target number, a first sequence setting module generates a sequence indicating N target numbers of cylinders to be activated during the N sub-periods, respectively. A second sequence setting module retrieves N predetermined sequences for activating and deactivating cylinders during the N sub-periods, respectively, and generates a target sequence for activating and deactivating cylinders during the future period based on the N predetermined sequences. During the future period, a cylinder actuator module: activates opening of intake and exhaust valves of the cylinders that are to be activated based on the target sequence; and deactivates opening of intake and exhaust valves of the cylinders that are to be deactivated based on the target sequence.

16 Claims, 4 Drawing Sheets

(51) Int. Cl.
*F02D 11/10* (2006.01)
*F02D 37/02* (2006.01)
*F02D 13/02* (2006.01)

(52) U.S. Cl.
CPC ............. *F02D13/0219* (2013.01); *F02D 37/02* (2013.01); *F02D 41/0002* (2013.01); *F02D 2041/0012* (2013.01); *Y02T 10/18* (2013.01)

(56) References Cited

U.S. PATENT DOCUMENTS

| | | | | |
|---|---|---|---|---|
| 4,172,434 A * | 10/1979 | Coles | ................ | F02D 41/1498 123/198 F |
| 4,377,997 A * | 3/1983 | Staerzl | ................ | F02P 1/086 123/406.29 |
| 4,434,767 A * | 3/1984 | Kohama | ............ | F02D 41/0087 123/198 F |
| 4,489,695 A * | 12/1984 | Kohama | ............ | F02D 41/0087 123/198 F |
| 4,509,488 A * | 4/1985 | Forster | ................ | F02D 41/0087 123/198 F |
| 4,535,744 A * | 8/1985 | Matsumura | ............ | F02D 17/02 123/325 |
| 4,770,148 A | 9/1988 | Hibino et al. | | |
| 4,887,216 A | 12/1989 | Ohnari et al. | | |
| 4,974,563 A | 12/1990 | Ikeda et al. | | |
| 4,987,888 A | 1/1991 | Funabashi et al. | | |
| 5,042,444 A * | 8/1991 | Hayes | ................ | F02D 17/02 123/198 F |
| 5,094,213 A * | 3/1992 | Dudek | ................ | F02D 37/00 123/339.27 |
| 5,226,513 A * | 7/1993 | Shibayama | ............ | F16H 61/143 192/3.3 |
| 5,278,760 A * | 1/1994 | Ribbens | ............ | F02D 41/1498 123/436 |
| 5,357,932 A * | 10/1994 | Clinton | ............... | F02D 13/0219 123/478 |
| 5,374,224 A * | 12/1994 | Huffmaster | ............ | F02D 37/02 123/198 F |
| 5,377,631 A * | 1/1995 | Schechter | ................ | F01L 9/02 123/198 F |
| 5,423,208 A * | 6/1995 | Dudek | ................ | F02D 41/045 123/478 |
| 5,465,617 A * | 11/1995 | Dudek | ................ | F02D 41/18 73/1.34 |
| 5,540,633 A | 7/1996 | Yamanaka et al. | | |
| 5,553,575 A * | 9/1996 | Beck | ................ | F02B 37/16 123/198 F |
| 5,584,266 A * | 12/1996 | Motose | ................ | F02D 41/08 123/198 F |
| 5,669,354 A * | 9/1997 | Morris | ................ | F02D 41/1498 123/406.24 |
| 5,692,471 A * | 12/1997 | Zhang | ................ | B60K 28/16 123/350 |
| 5,720,257 A * | 2/1998 | Motose | ................ | F02D 41/0087 123/339.14 |
| 5,813,383 A | 9/1998 | Cummings | | |
| 5,884,605 A * | 3/1999 | Nagaishi | ............ | F02P 5/1521 123/339.11 |
| 5,909,720 A * | 6/1999 | Yamaoka | ................ | B60K 6/365 123/179.3 |
| 5,931,140 A | 8/1999 | Maloney | | |
| 5,934,263 A | 8/1999 | Russ et al. | | |
| 5,941,927 A | 8/1999 | Pfitz | | |
| 5,975,052 A * | 11/1999 | Moyer | ................ | F01B 17/02 123/198 F |
| 5,983,867 A | 11/1999 | Stuber et al. | | |
| 6,125,812 A | 10/2000 | Garabedian | | |
| 6,158,411 A * | 12/2000 | Morikawa | ............ | F02D 37/02 123/304 |
| 6,244,242 B1* | 6/2001 | Grizzle | ................ | F02D 17/02 123/295 |
| 6,247,449 B1* | 6/2001 | Persson | ................ | F02D 17/02 123/192.1 |
| 6,272,427 B1 | 8/2001 | Wild et al. | | |
| 6,286,366 B1 | 9/2001 | Chen et al. | | |
| 6,295,500 B1 | 9/2001 | Cullen et al. | | |
| 6,332,446 B1 | 12/2001 | Matsumoto et al. | | |
| 6,334,425 B1 | 1/2002 | Nagatani et al. | | |
| 6,355,986 B1 | 3/2002 | Kato et al. | | |
| 6,360,724 B1* | 3/2002 | Suhre | ................ | F02D 17/02 123/198 F |
| 6,363,316 B1 | 3/2002 | Soliman et al. | | |
| 6,371,075 B2 | 4/2002 | Koch | | |
| 6,385,521 B1* | 5/2002 | Ito | ................ | B60W 10/06 477/34 |
| 6,408,625 B1 | 6/2002 | Woon et al. | | |
| 6,520,140 B2 | 2/2003 | Dreymuller et al. | | |
| 6,546,912 B2* | 4/2003 | Tuken | ................ | F02D 41/0085 123/436 |
| 6,619,258 B2 | 9/2003 | McKay et al. | | |
| 6,622,548 B1 | 9/2003 | Hernandez | | |
| 6,694,806 B2 | 2/2004 | Kumagai et al. | | |
| 6,754,577 B2 | 6/2004 | Gross et al. | | |
| 6,760,656 B2* | 7/2004 | Matthews | ............ | F02D 41/0087 123/480 |
| 6,850,831 B2 | 2/2005 | Buckland et al. | | |
| 6,909,961 B2 | 6/2005 | Wild et al. | | |
| 6,978,204 B2* | 12/2005 | Surnilla | ................ | F02P 5/1504 123/325 |
| 6,980,902 B2 | 12/2005 | Nakazawa | | |
| 6,981,492 B2 | 1/2006 | Barba et al. | | |
| 6,983,737 B2 | 1/2006 | Gross et al. | | |
| 7,003,390 B2 | 2/2006 | Kaga | | |
| 7,024,301 B1 | 4/2006 | Kar et al. | | |
| 7,028,661 B1 | 4/2006 | Bonne et al. | | |
| 7,032,545 B2* | 4/2006 | Lewis | ................ | F01L 1/36 123/198 F |
| 7,032,581 B2 | 4/2006 | Gibson et al. | | |
| 7,044,101 B1* | 5/2006 | Duty | ................ | F02D 17/02 123/198 F |
| 7,063,062 B2* | 6/2006 | Lewis | ................ | F02D 13/0215 123/198 F |
| 7,066,121 B2 | 6/2006 | Michelini et al. | | |
| 7,069,718 B2* | 7/2006 | Surnilla | ................ | F01N 13/011 123/198 F |
| 7,069,773 B2 | 7/2006 | Stempnik et al. | | |
| 7,086,386 B2* | 8/2006 | Doering | ............ | F02M 63/0205 123/198 F |
| 7,100,720 B2* | 9/2006 | Ishikawa | ................ | B60K 6/485 180/65.26 |
| 7,111,612 B2 | 9/2006 | Michelini et al. | | |
| 7,140,355 B2 | 11/2006 | Michelini et al. | | |
| 7,174,713 B2 | 2/2007 | Nitzke et al. | | |
| 7,174,879 B1* | 2/2007 | Chol | ................ | F02D 31/002 123/406.11 |
| 7,200,486 B2 | 4/2007 | Tanaka et al. | | |
| 7,203,588 B2 | 4/2007 | Kaneko et al. | | |
| 7,231,907 B2 | 6/2007 | Bolander et al. | | |
| 7,278,391 B1* | 10/2007 | Wong | ................ | F02D 41/0087 123/192.1 |
| 7,292,231 B2* | 11/2007 | Kodama | ............ | G03G 15/326 345/173 |
| 7,292,931 B2* | 11/2007 | Davis | ................ | F02D 41/18 701/102 |
| 7,319,929 B1* | 1/2008 | Davis | ................ | F02D 41/18 123/361 |
| 7,363,111 B2* | 4/2008 | Vian | ................ | G05B 23/024 700/279 |
| 7,367,318 B2 | 5/2008 | Moriya et al. | | |
| 7,415,345 B2 | 8/2008 | Wild | | |
| 7,440,838 B2 | 10/2008 | Livshiz et al. | | |
| 7,464,676 B2* | 12/2008 | Wiggins | ............ | F01L 1/344 123/90.15 |
| 7,472,014 B1 | 12/2008 | Albertson et al. | | |
| 7,497,074 B2* | 3/2009 | Surnilla | ............ | F02D 41/0087 123/520 |
| 7,499,791 B2 | 3/2009 | You et al. | | |
| 7,503,312 B2* | 3/2009 | Surnilla | ............ | F02D 41/0082 123/198 F |
| 7,509,201 B2* | 3/2009 | Bolander | ............ | B60W 10/023 701/53 |
| 7,555,896 B2 | 7/2009 | Lewis et al. | | |

(56) References Cited

U.S. PATENT DOCUMENTS

| | | | |
|---|---|---|---|
| 7,577,511 B1* | 8/2009 | Tripathi | F02D 41/0087 701/103 |
| 7,581,531 B2 | 9/2009 | Schulz | |
| 7,614,384 B2 | 11/2009 | Livshiz et al. | |
| 7,620,188 B2 | 11/2009 | Inoue et al. | |
| 7,621,262 B2 | 11/2009 | Zubeck | |
| 7,634,349 B2 | 12/2009 | Senft et al. | |
| 7,685,976 B2* | 3/2010 | Marriott | F02D 13/0215 123/348 |
| 7,785,230 B2* | 8/2010 | Gibson | B60W 30/20 477/101 |
| 7,836,866 B2* | 11/2010 | Luken | F02D 17/02 123/481 |
| 7,849,835 B2* | 12/2010 | Tripathi | F02D 41/0087 123/350 |
| 7,886,715 B2 | 2/2011 | Tripathi et al. | |
| 7,930,087 B2* | 4/2011 | Gibson | F02D 13/04 123/321 |
| 7,946,263 B2 | 5/2011 | O'Neill et al. | |
| 7,954,474 B2 | 6/2011 | Tripathi et al. | |
| 8,050,841 B2 | 11/2011 | Costin et al. | |
| 8,099,224 B2 | 1/2012 | Tripathi et al. | |
| 8,108,132 B2 | 1/2012 | Reinke | |
| 8,131,445 B2 | 3/2012 | Tripathi et al. | |
| 8,131,447 B2 | 3/2012 | Tripathi et al. | |
| 8,135,410 B2* | 3/2012 | Forte | H04W 84/16 370/329 |
| 8,145,410 B2 | 3/2012 | Berger et al. | |
| 8,146,565 B2 | 4/2012 | Leone et al. | |
| 8,272,367 B2* | 9/2012 | Shikama | F02D 11/105 123/406.24 |
| 8,347,856 B2 | 1/2013 | Leone et al. | |
| 8,473,179 B2* | 6/2013 | Whitney | F02D 13/0207 701/102 |
| 8,616,181 B2 | 12/2013 | Sahandiesfanjani et al. | |
| 8,646,430 B2* | 2/2014 | Kinoshita | B63B 35/731 123/198 DB |
| 8,646,435 B2 | 2/2014 | Dibble et al. | |
| 8,701,628 B2 | 4/2014 | Tripathi et al. | |
| 8,706,383 B2 | 4/2014 | Sauve et al. | |
| 8,833,058 B2* | 9/2014 | Ervin | F02D 41/0245 60/274 |
| 8,833,345 B2 | 9/2014 | Pochner et al. | |
| 8,869,773 B2 | 10/2014 | Tripathi et al. | |
| 8,979,708 B2 | 3/2015 | Burtch | |
| 9,140,622 B2 | 9/2015 | Beikmann | |
| 9,222,427 B2 | 12/2015 | Matthews et al. | |
| 2001/0007964 A1 | 7/2001 | Poljansek et al. | |
| 2002/0039950 A1 | 4/2002 | Graf et al. | |
| 2002/0156568 A1 | 10/2002 | Knott et al. | |
| 2002/0162540 A1* | 11/2002 | Matthews | F02D 17/02 123/481 |
| 2002/0189574 A1 | 12/2002 | Kim | |
| 2003/0116130 A1* | 6/2003 | Kisaka | F02D 37/02 123/406.45 |
| 2003/0123467 A1* | 7/2003 | Du | H04L 12/4625 370/401 |
| 2003/0131820 A1* | 7/2003 | Mckay | F01L 13/0005 123/198 F |
| 2003/0172900 A1* | 9/2003 | Boyer | F01L 1/34 123/198 F |
| 2004/0007211 A1 | 1/2004 | Kobayashi | |
| 2004/0034460 A1 | 2/2004 | Folkerts et al. | |
| 2004/0069290 A1 | 4/2004 | Bucktron et al. | |
| 2004/0122584 A1 | 6/2004 | Muto et al. | |
| 2004/0129249 A1 | 7/2004 | Kondo | |
| 2004/0206072 A1* | 10/2004 | Surnilla | F01N 3/0814 60/285 |
| 2004/0258251 A1 | 12/2004 | Inoue et al. | |
| 2005/0016492 A1* | 1/2005 | Matthews | F02D 17/02 123/198 F |
| 2005/0056250 A1 | 3/2005 | Stroh | |
| 2005/0098156 A1 | 5/2005 | Ohtani | |
| 2005/0131618 A1* | 6/2005 | Megli | F02D 13/0215 701/101 |
| 2005/0197761 A1* | 9/2005 | Bidner | F02P 5/045 701/105 |
| 2005/0199220 A1* | 9/2005 | Ogiso | F02D 13/06 123/481 |
| 2005/0204726 A1* | 9/2005 | Lewis | F02D 13/06 60/285 |
| 2005/0204727 A1* | 9/2005 | Lewis | F01L 9/04 60/285 |
| 2005/0205028 A1* | 9/2005 | Lewis | F02D 13/06 123/90.11 |
| 2005/0205045 A1* | 9/2005 | Michelini | F02D 13/06 123/198 F |
| 2005/0205060 A1* | 9/2005 | Michelini | F01L 1/36 123/432 |
| 2005/0205063 A1* | 9/2005 | Kolmanovsky | F01L 9/04 123/436 |
| 2005/0205069 A1* | 9/2005 | Lewis | F01L 1/38 123/491 |
| 2005/0205074 A1* | 9/2005 | Gibson | F02D 13/0207 123/673 |
| 2005/0235743 A1* | 10/2005 | Stempnik | F02D 11/105 73/114.32 |
| 2006/0107919 A1* | 5/2006 | Nishi | F02D 13/06 123/198 F |
| 2006/0112918 A1 | 6/2006 | Persson | |
| 2006/0130814 A1 | 6/2006 | Bolander et al. | |
| 2006/0178802 A1 | 8/2006 | Bolander et al. | |
| 2007/0012040 A1 | 1/2007 | Nitzke et al. | |
| 2007/0042861 A1* | 2/2007 | Takaoka | F60K 3/365 477/3 |
| 2007/0051351 A1 | 3/2007 | Pallett et al. | |
| 2007/0100534 A1 | 5/2007 | Katsumata | |
| 2007/0101969 A1 | 5/2007 | Lay et al. | |
| 2007/0107692 A1* | 5/2007 | Kuo | F02B 23/0672 123/305 |
| 2007/0131169 A1 | 6/2007 | Ahn | |
| 2007/0131196 A1* | 6/2007 | Gibson | F01L 1/38 123/198 F |
| 2007/0135988 A1 | 6/2007 | Kidston et al. | |
| 2007/0235005 A1* | 10/2007 | Lewis | F01L 9/04 123/322 |
| 2008/0000149 A1 | 1/2008 | Aradi | |
| 2008/0041327 A1 | 2/2008 | Lewis et al. | |
| 2008/0066699 A1* | 3/2008 | Michelini | F02D 13/0253 123/90.11 |
| 2008/0098969 A1 | 5/2008 | Reed et al. | |
| 2008/0109151 A1 | 5/2008 | Jaros et al. | |
| 2008/0121211 A1 | 5/2008 | Livshiz et al. | |
| 2008/0154468 A1* | 6/2008 | Berger | B60K 6/365 701/54 |
| 2008/0254926 A1 | 10/2008 | Schuseil et al. | |
| 2008/0262698 A1 | 10/2008 | Lahti et al. | |
| 2008/0288146 A1* | 11/2008 | Beechie | B60W 10/023 701/58 |
| 2009/0007877 A1* | 1/2009 | Raiford | F02D 15/00 123/192.1 |
| 2009/0013667 A1 | 1/2009 | Winstead | |
| 2009/0013668 A1 | 1/2009 | Winstead | |
| 2009/0013669 A1 | 1/2009 | Winstead | |
| 2009/0013969 A1 | 1/2009 | Winstead | |
| 2009/0018746 A1 | 1/2009 | Miller et al. | |
| 2009/0030594 A1* | 1/2009 | You | F02D 41/042 701/112 |
| 2009/0042458 A1* | 2/2009 | Kinoshita | B63B 35/731 440/1 |
| 2009/0042463 A1 | 2/2009 | Kinoshita | |
| 2009/0118914 A1 | 5/2009 | Schwenke et al. | |
| 2009/0118968 A1 | 5/2009 | Livshiz et al. | |
| 2009/0118975 A1* | 5/2009 | Murakami | F02D 17/02 701/103 |
| 2009/0118986 A1 | 5/2009 | Kita | |
| 2009/0177371 A1* | 7/2009 | Reinke | F02D 17/04 701/111 |
| 2009/0204312 A1* | 8/2009 | Moriya | F01L 1/344 704/103 |
| 2009/0241872 A1* | 10/2009 | Wang | F01L 9/04 123/90.11 |
| 2009/0248277 A1* | 10/2009 | Shinagawa | F02D 13/0238 701/103 |

(56) References Cited

U.S. PATENT DOCUMENTS

| | | | |
|---|---|---|---|
| 2009/0248278 A1* | 10/2009 | Nakasaka | F02D 13/0238 701/103 |
| 2009/0292435 A1 | 11/2009 | Costin et al. | |
| 2010/0006065 A1 | 1/2010 | Tripathi et al. | |
| 2010/0010724 A1* | 1/2010 | Tripathi | F02D 41/0087 701/103 |
| 2010/0012072 A1* | 1/2010 | Leone | F02D 41/0087 123/192.1 |
| 2010/0030447 A1 | 2/2010 | Smyth et al. | |
| 2010/0036571 A1 | 2/2010 | Han et al. | |
| 2010/0042308 A1 | 2/2010 | Kobayashi et al. | |
| 2010/0050993 A1* | 3/2010 | Zhao | F02D 17/02 123/481 |
| 2010/0059004 A1* | 3/2010 | Gill | F02B 29/083 123/90.11 |
| 2010/0100299 A1* | 4/2010 | Tripathi | F02D 41/0087 701/102 |
| 2010/0107630 A1 | 5/2010 | Hamama et al. | |
| 2010/0211299 A1 | 8/2010 | Lewis et al. | |
| 2010/0222989 A1 | 9/2010 | Nishimura | |
| 2010/0282202 A1 | 11/2010 | Luken | |
| 2010/0318275 A1 | 12/2010 | Borchsenius et al. | |
| 2011/0030657 A1* | 2/2011 | Tripathi | F02D 17/02 123/481 |
| 2011/0048372 A1* | 3/2011 | Dibble | F02D 41/0087 123/350 |
| 2011/0088661 A1 | 4/2011 | Sczomak et al. | |
| 2011/0094475 A1 | 4/2011 | Riegel et al. | |
| 2011/0107986 A1* | 5/2011 | Winstead | F02D 13/0207 123/90.15 |
| 2011/0144883 A1* | 6/2011 | Rollinger | F02D 13/06 701/102 |
| 2011/0178693 A1 | 7/2011 | Chang et al. | |
| 2011/0208405 A1* | 8/2011 | Tripathi | F02D 17/02 701/102 |
| 2011/0213540 A1* | 9/2011 | Tripathi | F02D 37/02 701/102 |
| 2011/0213541 A1 | 9/2011 | Tripathi et al. | |
| 2011/0251773 A1 | 10/2011 | Sahandiesfanjani et al. | |
| 2011/0264342 A1 | 10/2011 | Baur et al. | |
| 2011/0265454 A1 | 11/2011 | Smith et al. | |
| 2011/0265771 A1 | 11/2011 | Banker et al. | |
| 2011/0295483 A1 | 12/2011 | Ma et al. | |
| 2011/0313643 A1 | 12/2011 | Lucatello et al. | |
| 2012/0029787 A1 | 2/2012 | Whitney et al. | |
| 2012/0055444 A1* | 3/2012 | Tobergte | F02D 13/06 123/294 |
| 2012/0103312 A1 | 5/2012 | Sasai et al. | |
| 2012/0109495 A1* | 5/2012 | Tripathi | F02D 41/30 701/102 |
| 2012/0116647 A1* | 5/2012 | Pochner | F02D 17/02 701/102 |
| 2012/0143471 A1* | 6/2012 | Tripathi | F02D 28/00 701/102 |
| 2012/0180759 A1 | 7/2012 | Whitney et al. | |
| 2012/0221217 A1* | 8/2012 | Sujan | B60W 10/06 701/54 |
| 2012/0285161 A1* | 11/2012 | Kerns | F02D 41/0087 60/598 |
| 2013/0092127 A1 | 4/2013 | Pirjaberi et al. | |
| 2013/0092128 A1* | 4/2013 | Pirjaberi | F02D 41/0087 123/406.23 |
| 2013/0184949 A1 | 7/2013 | Saito et al. | |
| 2013/0289853 A1* | 10/2013 | Serrano | F02D 45/00 701/110 |
| 2014/0041625 A1* | 2/2014 | Pirjaberi | F02D 41/00 123/349 |
| 2014/0041641 A1* | 2/2014 | Carlson | F02M 25/08 123/520 |
| 2014/0053802 A1* | 2/2014 | Rayl | F02D 41/0087 123/350 |
| 2014/0053803 A1 | 2/2014 | Rayl | |
| 2014/0053804 A1* | 2/2014 | Rayl | F02D 41/0087 123/350 |
| 2014/0053805 A1* | 2/2014 | Brennan | F02D 41/0087 123/350 |
| 2014/0069178 A1* | 3/2014 | Beikmann | G01L 23/22 73/114.07 |
| 2014/0069374 A1 | 3/2014 | Matthews | |
| 2014/0069375 A1 | 3/2014 | Matthews et al. | |
| 2014/0069376 A1 | 3/2014 | Matthews et al. | |
| 2014/0069377 A1 | 3/2014 | Brennan et al. | |
| 2014/0069378 A1* | 3/2014 | Burleigh | F02D 41/0087 123/350 |
| 2014/0069379 A1* | 3/2014 | Beikmann | F02D 41/0087 123/350 |
| 2014/0069381 A1* | 3/2014 | Beikmann | F02D 41/0087 123/406.12 |
| 2014/0090623 A1* | 4/2014 | Beikmann | F02D 41/0087 123/350 |
| 2014/0090624 A1* | 4/2014 | Verner | F02D 41/0087 123/406.12 |
| 2014/0102411 A1* | 4/2014 | Brennan | F02D 41/021 123/350 |
| 2014/0190448 A1 | 7/2014 | Brennan et al. | |
| 2014/0190449 A1 | 7/2014 | Phillips | |
| 2014/0194276 A1 | 7/2014 | Burtch | |
| 2014/0207359 A1 | 7/2014 | Phillips | |
| 2015/0240671 A1 | 8/2015 | Nakamura | |
| 2015/0260112 A1 | 9/2015 | Liu et al. | |
| 2015/0260117 A1 | 9/2015 | Shost et al. | |
| 2015/0354470 A1 | 12/2015 | Li et al. | |
| 2015/0361907 A1 | 12/2015 | Hayman et al. | |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352A A | 8/2011 |

OTHER PUBLICATIONS

U.S. Appl. No. 61/952,737, filed Mar. 13, 2014, Shost et al.
U.S. Appl. No. 14/734,619, filed Jun. 9, 2015, Matthews.
International Search Report and Written Opinion dated Jun. 17, 2015 corresponding to International Application No. PCT/US2015/019496, 14 pages.
U.S. Appl. No. 14/211,389, filed Mar. 14, 2014, Liu et al.
U.S. Appl. No. 14/310,063, filed Jun. 20, 2014, Wagh et al.
U.S. Appl. No. 14/300,469, filed Jun. 10, 2014, Li et al.
U.S. Appl. No. 14/449,726, filed Aug. 1, 2014, Hayman et al.
U.S. Appl. No. 13/798,351, filed Mar. 13, 2012, Ray.
U.S. Appl. No. 13/798,384, filed Mar. 13, 2013, Burtch.
U.S. Appl. No. 13/798,400, filed Mar. 13, 2013, Phillips.
U.S. Appl. No. 13/798,435, filed Mar. 13, 2013, Matthews.
U.S. Appl. No. 13/798,451, filed Mar. 13, 2013, Rayl.
U.S. Appl. No. 13/798,471, filed Mar. 13, 2013, Matthews et al.
U.S. Appl. No. 13/798,518, filed Mar. 13, 2013, Beikmann.
U.S. Appl. No. 13/798,536, filed Mar. 13, 2013, Matthews et al.
U.S. Appl. No. 13/798,540, filed Mar. 13, 2013, Brennan et al.
U.S. Appl. No. 13/798,574, filed Mar. 13, 2013, Verner.
U.S. Appl. No. 13/798,586, filed Mar. 13, 2013, Rayl et al.
U.S. Appl. No. 13/798,590, filed Mar. 13, 2013, Brennan et al.
U.S. Appl. No. 13/798,624, filed Mar. 13, 2013, Brennan et al.
U.S. Appl. No. 13/798,701, filed Mar. 13, 2013, Burleigh et al.
U.S. Appl. No. 13/798,737, filed Mar. 13, 2013, Beikmann.
U.S. Appl. No. 13/798,775, filed Mar. 13, 2013, Phillips.
U.S. Appl. No. 13/799,116, filed Mar. 13, 2013, Brennan.
U.S. Appl. No. 13/799,129, filed Mar. 13, 2013, Beikmann.
U.S. Appl. No. 14/143,267, filed Dec. 30, 2013, Gehringer et al.
U.S. Appl. No. 14/638,908, filed Mar. 4, 2015, Shost et al.

* cited by examiner

CYLINDER ACTIVATION/DEACTIVATION SEQUENCE CONTROL SYSTEMS AND METHODS

CROSS-REFERENCE TO RELATED APPLICATIONS

This application claims the benefit of U.S. Provisional Application No. 61/709,194, filed on Oct. 3, 2012. The disclosure of the above application is incorporated herein by reference in its entirety.

This application is related to U.S. patent application Ser. No. 13/798,451 filed on Mar. 13, 2013, Ser. No. 13/798,351 filed on Mar. 13, 2013, Ser. No. 13/798,586 filed on Mar. 13, 2013, Ser. No. 13/798,590 filed on Mar. 13, 2013, Ser. No. 13/798,536 filed on Mar. 13, 2013, Ser. No. 13/798,435 filed on Mar. 13, 2013, Ser. No. 13/798,471 filed on Mar. 13, 2013, Ser. No. 13/798,737 filed on Mar. 13, 2013, Ser. No. 13/798,701 filed on Mar. 13, 2013, Ser. No. 13/798,518 filed on Mar. 13, 2013, Ser. No. 13/799,129 filed on Mar. 13, 2013, 13/798,540 filed on Mar. 13, 2013, Ser. No. 13/798,574 filed on Mar. 13, 2013, Ser. No. 13/799,116 filed on Mar. 13, 2013, Ser. No. 13/798,624 filed on Mar. 13, 2013, Ser. No. 13/798,384 filed on Mar. 13, 2013, Ser. No. 13/798,775 filed on Mar. 13, 2013, and Ser. No. 13/798,400 filed on Mar. 13, 2013. The entire disclosures of the above applications are incorporated herein by reference.

FIELD

The present disclosure relates to internal combustion engines and more specifically to engine control systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating opening and closing of intake valves of the cylinder and halting fueling of the cylinder. One or more cylinders may be deactivated, for example, to decrease fuel consumption when the engine can produce a requested amount of torque while the one or more cylinders are deactivated.

SUMMARY

A target cylinder count module determines a target number of cylinders of an engine to be activated during a future period. The future period includes N sub-periods and N is an integer greater than or equal to two. Based on the target number, a first sequence setting module generates a sequence indicating N target numbers of cylinders to be activated during the N sub-periods, respectively. A second sequence setting module retrieves N predetermined sequences for activating and deactivating cylinders of the engine during the N sub-periods, respectively, and generates a target sequence for activating and deactivating cylinders of the engine during the future period based on the N predetermined sequences. During the future period, a cylinder actuator module: activates opening of intake and exhaust valves of first ones of the cylinders that are to be activated based on the target sequence; and deactivates opening of intake and exhaust valves of second ones of the cylinders that are to be deactivated based on the target sequence.

In other features, a cylinder control method includes: determining a target number of cylinders of an engine to be activated during a future period, wherein the future period includes N sub-periods and N is an integer greater than or equal to two; based on the target number, generating a sequence indicating N target numbers of cylinders to be activated during the N sub-periods, respectively; and retrieving N predetermined sequences for activating and deactivating cylinders of the engine during the N sub-periods, respectively. The cylinder control method further includes: generating a target sequence for activating and deactivating cylinders of the engine during the future period based on the N predetermined sequences; and during the future period: activating opening of intake and exhaust valves of first ones of the cylinders that are to be activated based on the target sequence; and deactivating opening of intake and exhaust valves of second ones of the cylinders that are to be deactivated based on the target sequence.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption when the engine can produce a requested amount of torque while the one or more cylinders are deactivated. Deactivation of one or more cylinders, however, may increase powertrain-induced vibration relative to the activation of all of the cylinders.

The ECM of the present disclosure determines an average number of cylinders per sub-period to be activated during a future period including N sub-periods. N is an integer greater than or equal to two. Based on achieving the average number of cylinders over the future period, the ECM generates a first sequence indicating N target numbers of cylinders to be activated during the N sub-periods, respectively. The ECM generates a second sequence indicating N predetermined subsequences for activating and deactivating cylinders to achieve the N target numbers of activated cylinders during the N sub-periods, respectively. The predetermined subsequences are selected to smooth torque production and delivery, minimize harmonic vehicle vibration, minimize impulsive vibration characteristics, and minimize induction and exhaust noise.

The ECM generates a target sequence for activating and deactivating cylinders of the engine during the future period based on the N predetermined subsequences. The cylinders are activated and deactivated based on the target sequence during the future period. More specifically, the cylinders are activated and deactivated based on the N predetermined subsequences during the N sub-periods, respectively. Deactivation of a cylinder may include deactivating opening and closing of intake valves of the cylinder and halting fueling of the cylinder.

Figure 1:
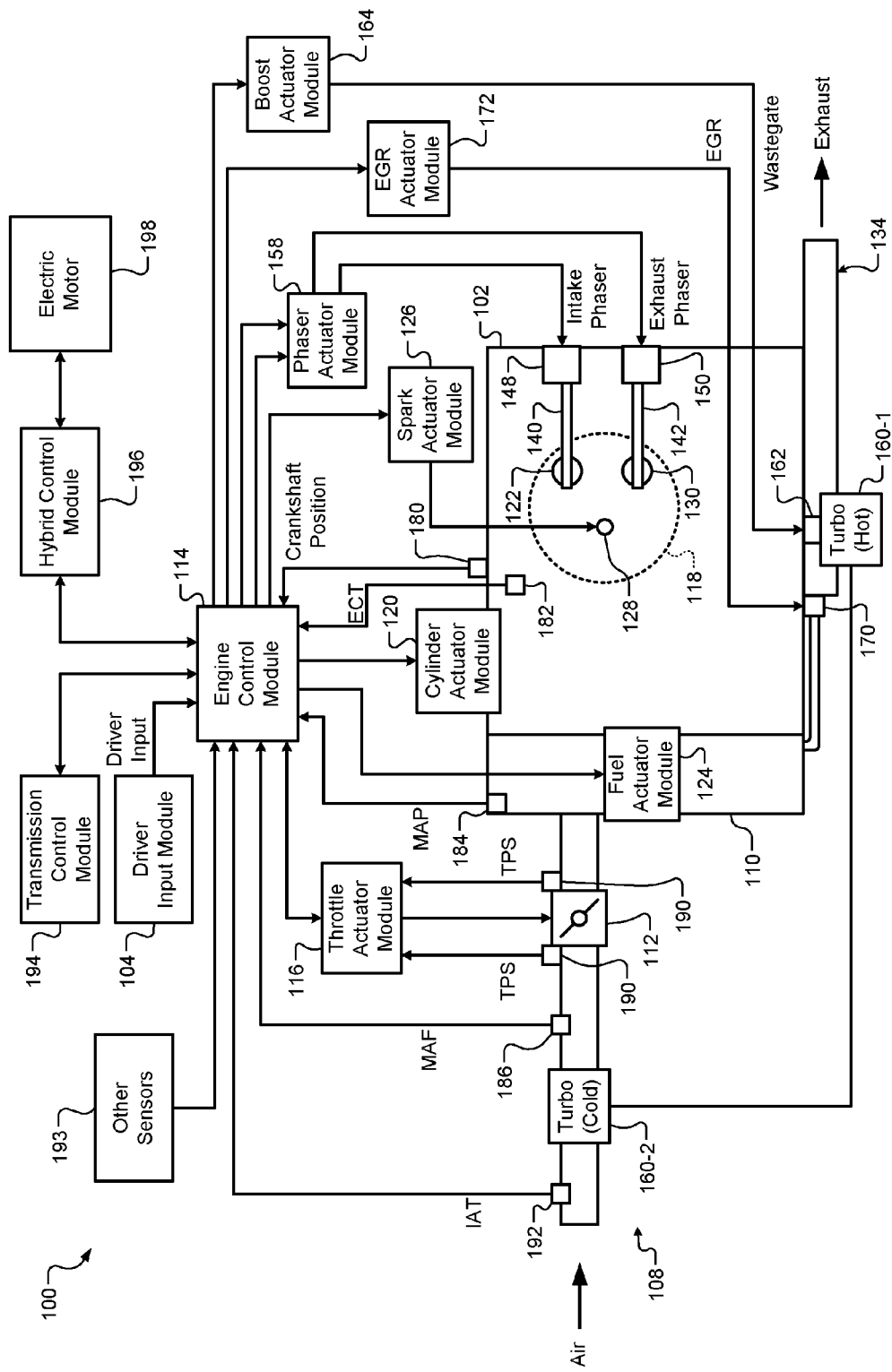
FIG. 1 is a functional block diagram of an example engine system according to the present disclosure.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle. The four strokes, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine system 100 may also include one or more other sensors 193. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The engine 102 outputs torque to a transmission (not shown) via the crankshaft. One or more coupling devices, such as a torque converter and/or one or more clutches, regulate torque transfer between a transmission input shaft and the crankshaft. Torque is transferred between the transmission input shaft and a transmission output shaft via the gears.

Torque is transferred between the transmission output shaft and wheels of the vehicle via one or more differentials, driveshafts, etc. Wheels that receive torque output by the transmission may be referred to as driven wheels. Wheels that do not receive torque from the transmission may be referred to as undriven wheels.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a desired engine output torque.

Figure 2:
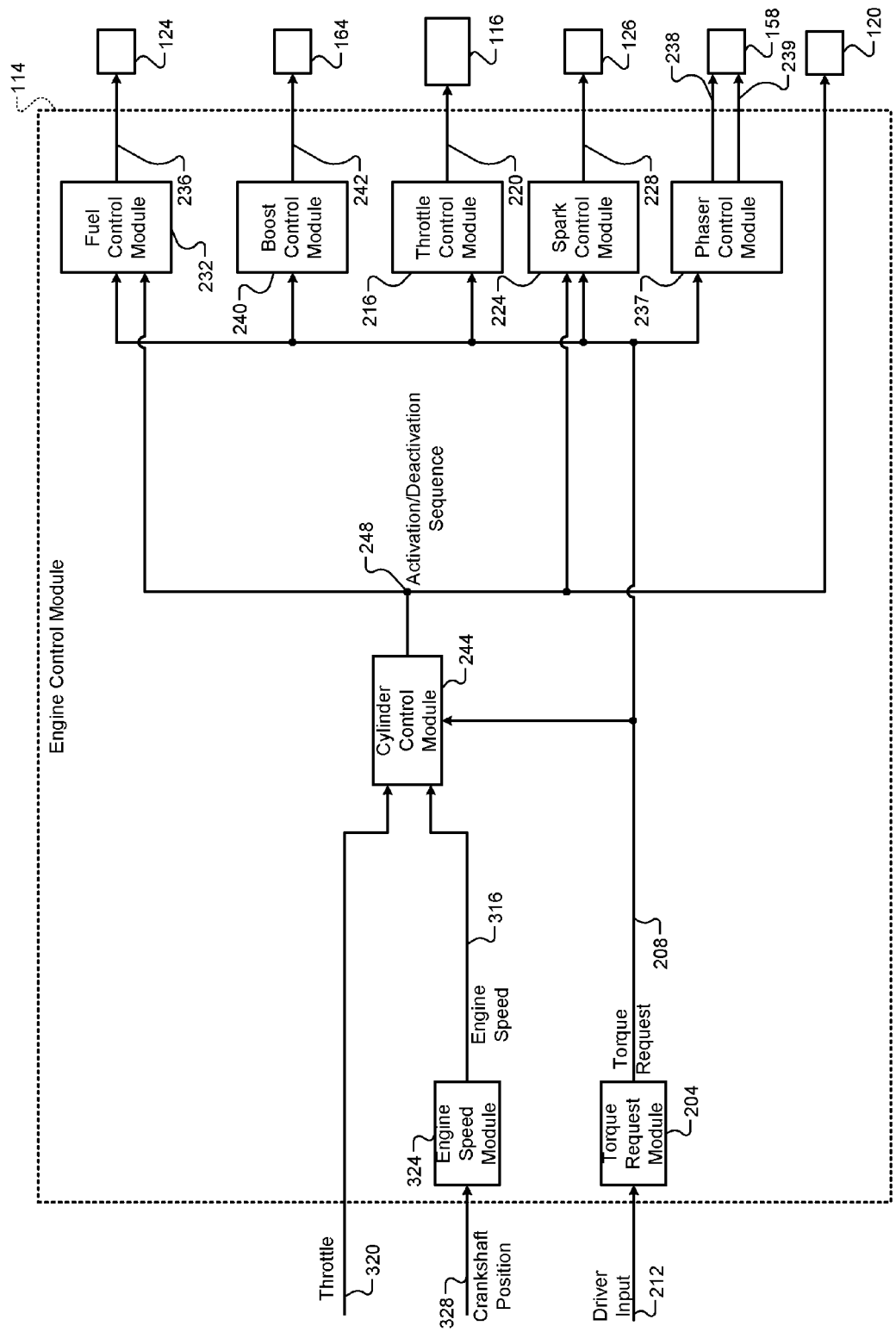
FIG. 2 is a functional block diagram of an example engine control system according to the present disclosure.

Referring now to FIG. 2, a functional block diagram of an example engine control system is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators may be controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 may determine a target spark timing 228 based on the torque request 208. The spark actuator module 126 may generate spark based on the target spark timing 228. A fuel control module 232 may determine one or more target fueling parameters 236 based on the torque request 208. For example, the target fueling parameters 236 may include fuel injection amount, number of fuel injections for injecting the amount, and timing for each of the injections. The fuel actuator module 124 may inject fuel based on the target fueling parameters 236.

A phaser control module 237 may determine target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. A boost control module 240 may determine a target boost 242 based on the torque request 208. The boost actuator module 164 may control boost output by the boost device(s) based on the target boost 242.

A cylinder control module 244 (see also FIG. 3) determines a target cylinder activation/deactivation sequence 248 based on the torque request 208. The cylinder actuator module 120 deactivates the intake and exhaust valves of the cylinders that are to be deactivated according to the target cylinder activation/deactivation sequence 248. The cylinder actuator module 120 allows opening and closing of the intake and exhaust valves of cylinders that are to be activated according to the target cylinder activation/deactivation sequence 248.

Fueling is halted (zero fueling) to cylinders that are to be deactivated according to the target cylinder activation/deactivation sequence 248, and fuel is provided to cylinders that are to be activated according to the target cylinder activation/deactivation sequence 248. Spark is provided to the cylinders that are to be activated according to the target cylinder activation/deactivation sequence 248. Spark may be provided or halted to cylinders that are to be deactivated according to the target cylinder activation/deactivation sequence 248. Cylinder deactivation is different than fuel cutoff (e.g., deceleration fuel cutoff) in that the intake and exhaust valves of cylinders to which fueling is halted during fuel cutoff are still opened and closed during the fuel cutoff whereas the intake and exhaust valves are maintained closed when deactivated.

Figure 3:
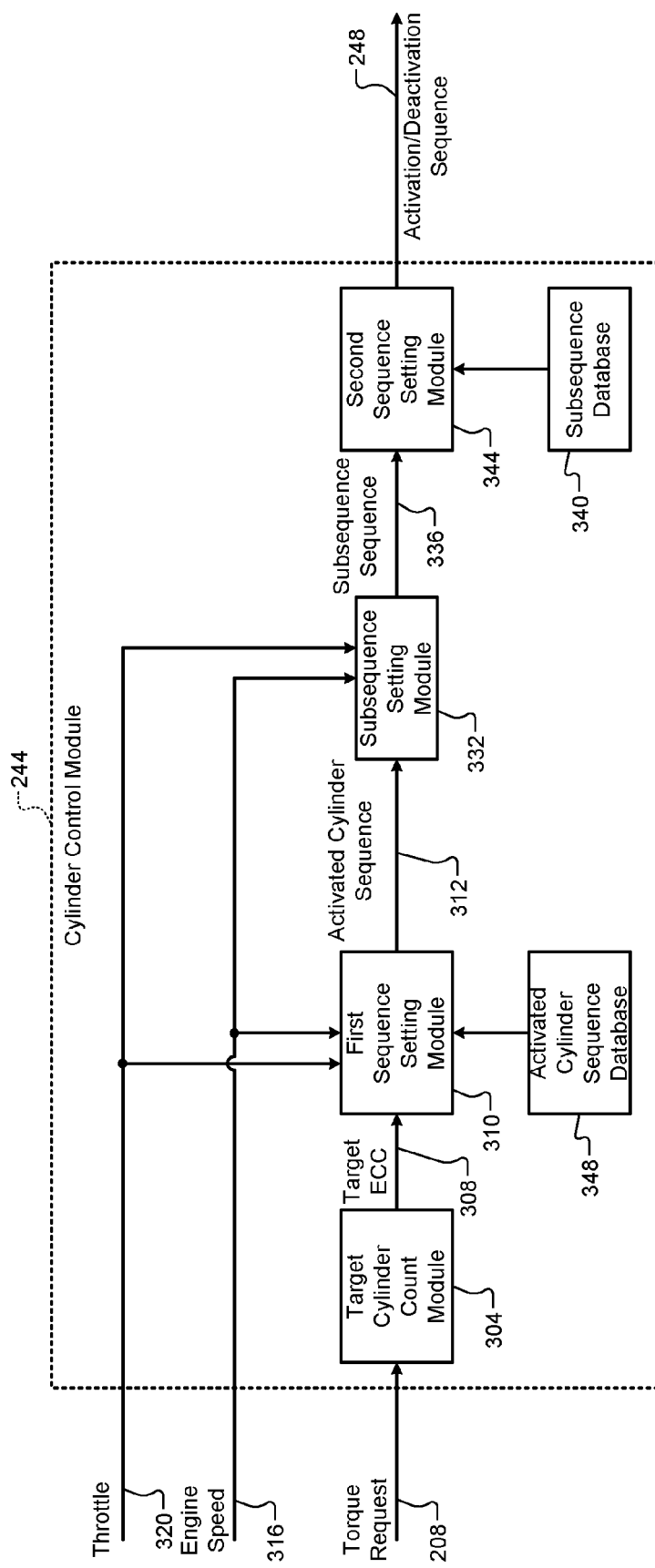
FIG. 3 is a functional block diagram of an example cylinder control module according to the present disclosure.

Referring now to FIG. 3, a functional block diagram of an example implementation of the cylinder control module 244 is presented. A target cylinder count module 304 generates a target effective cylinder count (ECC) 308. The target ECC 308 corresponds to a target number of cylinders to be activated per engine cycle on average over the next N engine cycles (corresponding to the next N cylinder events in a predetermined firing order of the cylinders). One engine cycle may refer to the period for each of the cylinders of the engine 102 to accomplish one combustion cycle. For example, in a four-stroke engine, one engine cycle may correspond to two crankshaft revolutions.

The target ECC 308 may be an integer or a non-integer that is between zero and the total number of possible cylinder events per engine cycle, inclusive. Cylinder events include cylinder firing events and events where deactivated cylinders would, if activated, be fired. While the example where N is equal to 10 is discussed below, N is an integer greater than or equal to two. While engine cycles and the next N engine cycles will be discussed, another suitable period (e.g., the next N sets of P number of cylinder events) may be used.

The target cylinder count module 304 generates the target ECC 308 based on the torque request 208. The target cylinder count module 304 may determine the target ECC 308, for example, using a function or a mapping that relates the torque request 208 to the target ECC 308. For example only, for a torque request that is approximately 50% of a maximum torque output of the engine 102 under the operating conditions, the target ECC 308 may be a value corresponding to approximately half of the total number of cylinders of the engine 102. The target cylinder count module 304 may generate the target ECC 308 further based on one or more other parameters, such as one or more loads on the engine 102 and/or one or more other suitable parameters.

A first sequence setting module 310 generates an activated cylinder sequence 312 to achieve the target ECC 308 over the next N engine cycles. The first sequence setting module 310 may determine the activated cylinder sequence 312, for example, using a mapping that relates the target ECC 308 to the activated cylinder sequence 312.

The activated cylinder sequence 312 includes a sequence of N integers that correspond to the number of cylinders that should be activated during the next N engine cycles, respectively. In this manner, the activated cylinder sequence 312 indicates how many cylinders should be activated during each of the next N engine cycles. For example, the activated cylinder sequence 312 may include an array including N integers for the next N engine cycles, respectively, such as:

[$I_1, I_2, I_3, I_4, I_5, I_6, I_7, I_8, I_9, I_{10}$], where N is equal to 10, $I_1$ is an integer number of cylinders to be activated during the first one of the next 10 engine cycles, $I_2$ is an integer number of cylinders to be activated during the second one of the next N engine cycles, $I_3$ is an integer number of cylinders to be activated during the third one of the next N engine cycles, and so on.

When the target ECC 308 is an integer, that number of cylinders can be activated during each of the next N engine cycles to achieve the target ECC 308. For example only, if the target ECC 308 is equal to 4, 4 cylinders can be activated per engine cycle to achieve the target ECC 308 of 4. An example of the activated cylinder sequence 312 for activating 4 cylinders per engine cycle during the next N engine cycles is provided below where N is equal to 10.

[4, 4, 4, 4, 4, 4, 4, 4, 4, 4].

Different numbers of activated cylinders per engine cycle can also be used to achieve the target ECC 308 when the target ECC 308 is an integer. For example only, if the target ECC 308 is equal to 4, 4 cylinders can be activated during one engine cycle, 3 cylinders can be activated during another engine cycle, and 5 cylinders can be activated during another engine cycle to achieve the target ECC 308 of 4. An example of the activated cylinder sequence 312 for activating one or more different numbers of activated cylinders is provided below where N is equal to 10.

[4, 5, 3, 4, 3, 5, 3, 5, 4, 4].

When the target ECC 308 is a non-integer, different numbers of activated cylinders per engine cycle are used to achieve the target ECC 308. For example only, if the target ECC 308 is equal to 5.4, the following example activated cylinder sequence 312 can be used to achieve the target ECC 308:

[5, 6, 5, 6, 5, 6, 5, 5, 6, 5]

where N is equal to 10, 5 indicates that 5 cylinders are activated during the corresponding ones of the next 10 engine cycles, and 6 indicates that 6 cylinders are activated during the corresponding ones of the next 10 engine cycles. While use of the two nearest integers to a non-integer value of the target ECC 308 have been discussed as examples, other inters may be used additionally or alternatively.

The first sequence setting module 310 may update or select the activated cylinder sequence 312 based on one or more other parameters, such as engine speed 316 and/or a throttle opening 320. For example only, the first sequence setting module 310 may update or select the activated cylinder sequence 312 such that greater numbers of activated cylinders are used near the end of the next N engine cycles (and lesser numbers of activated cylinders are used near the beginning of the next N engine cycles) when the engine speed 316 and/or the throttle opening 320 is increasing. This may provide for a smoother transition to an increase in the target ECC 308. The opposite may be true when the engine speed 316 and/or the throttle opening 320 is decreasing.

An engine speed module 324 (FIG. 2) may generate the engine speed 316 based on a crankshaft position 328 measured using the crankshaft position sensor 180. The throttle opening 320 may be generated based on measurements from one or more of the throttle position sensors 190.

A subsequence setting module 332 sets a sequence of subsequences 336 based on the activated cylinder sequence 312 and the engine speed 316. The sequence of subsequences 336 includes N indicators of N predetermined cylinder activation/deactivation subsequences to be used to achieve the corresponding numbers of activated cylinders (indicated by the activated cylinder sequence 312) during the next N engine cycles, respectively. The subsequence setting module 332 may set the sequence of subsequences 336, for example, using a mapping that relates the engine speed 316 and the activated cylinder sequence 312 to the sequence of subsequences 336.

Statistically speaking, one or more possible cylinder activation/deactivation subsequences are associated with each possible number of activated cylinders per engine cycle. A unique indicator may be associated with each of the possible cylinder activation/deactivation subsequence for achieving a given number of activated cylinders. The following tables include example indicators and possible subsequences for 5 and 6 active cylinders per engine cycle with 8 cylinder events per engine cycle:

| Unique indicator | Subsequence |
| --- | --- |
| 5 Cylinders Firing | |
| 5_01 | 00011111 |
| 5_02 | 00101111 |
| . | . |
| . | . |
| . | . |
| 5_10 | 01011101 |
| 5_11 | 01011110 |
| . | . |
| . | . |
| . | . |
| 5_28 | 10101011 |
| . | . |
| . | . |
| . | . |
| 5_56 | 11111000 |
| 6 Cylinders Firing | |
| 6_01 | 00111111 |
| 6_02 | 01011111 |
| . | . |
| . | . |
| . | . |
| 6_10 | 10110111 |
| 6_11 | 10111011 |
| . | . |
| . | . |
| . | . |
| 6_28 | 11111100 | where a 1 in a subsequence indicates that the corresponding cylinder in the firing order should be activated and a 0 indicates that the corresponding cylinder should be deactivated. While only possible subsequences for 5 and 6 active cylinders per engine cycle are provided above, one or more possible cylinder activation/deactivation subsequences are also associated with each other number of active cylinders per engine cycle. Also, subsequences having different lengths and/or subsequences with lengths that are different than the number of cylinder events per engine cycle can be used.

During a calibration phase of vehicle design, possible subsequences and sequences of the possible sequences producing minimum levels of vibration, minimum induction and exhaust noise, desired vibration characteristics, more even torque production/delivery, and better linkability with other possible subsequences are identified for various engine speeds. The identified subsequences are stored as predetermined cylinder activation/deactivation subsequences in a subsequence database 340. During vehicle operation, the subsequence setting module 332 sets the sequence of subsequences 336 based on the activated cylinder sequence 312 and the engine speed 316. An example of the sequence of subsequences 336 for the example activated cylinder sequence of [5, 6, 5, 6, 5, 6, 5, 5, 6, 5] is:

[5_23, 6_25, 5_19, 6_22, 5_55, 6_01, 5_23, 5_21, 6_11, 5_29], where 5_23 is the indicator of one of the predetermined cylinder activation/deactivation subsequences that is to be used to activate 5 cylinders during the first one of the next N engine cycles, where 6_25 is the indicator of one of the predetermined cylinder activation/deactivation subsequences that is to be used to activate 6 cylinders during the second one of the next N engine cycles, 5_19 is the indicator of one of the predetermined cylinder activation/deactivation subsequences that is to be used to activate 5 cylinders during the third one of the next N engine cycles, 6_22 is the indicator of one of the predetermined cylinder activation/deactivation subsequences that is to be used to activate 6 cylinders during the fourth one of the next N engine cycles, and so on.

A second sequence setting module 344 receives the sequence of subsequences 336 and generates the target cylinder activation/deactivation sequence 248. More specifically, the second sequence setting module 344 sets the target cylinder activation/deactivation sequence 248 to the predetermined cylinder activation/deactivation subsequences indicated in the sequence of subsequences 336, in the order specified in the sequence of subsequences 336. The second sequence setting module 344 retrieves the predetermined cylinder activation/deactivation subsequences indicated from the subsequence database 340. The cylinders are activated according to the target cylinder activation/deactivation sequence 248 during the next N engine cycles.

It may be desirable to vary the activated cylinder sequence 312 from one set of N engine cycles to another set of N engine cycles. This variation may be performed, for example, to prevent harmonic vibration from being experienced within a passenger cabin of the vehicle and to maintain a random vibration characteristic. For example, two or more predetermined activated cylinder sequences may be stored in an activated cylinder sequence database 348 for a given target ECC, and predetermined percentages of use may be provided for each of the predetermined activated cylinder sequences. If the target ECC 308 remains approximately constant, the first sequence setting module 310 may select the predetermined activated cylinder sequences for use as the activated cylinder sequence 312 in an order based on the predetermined percentages.

Figure 4:
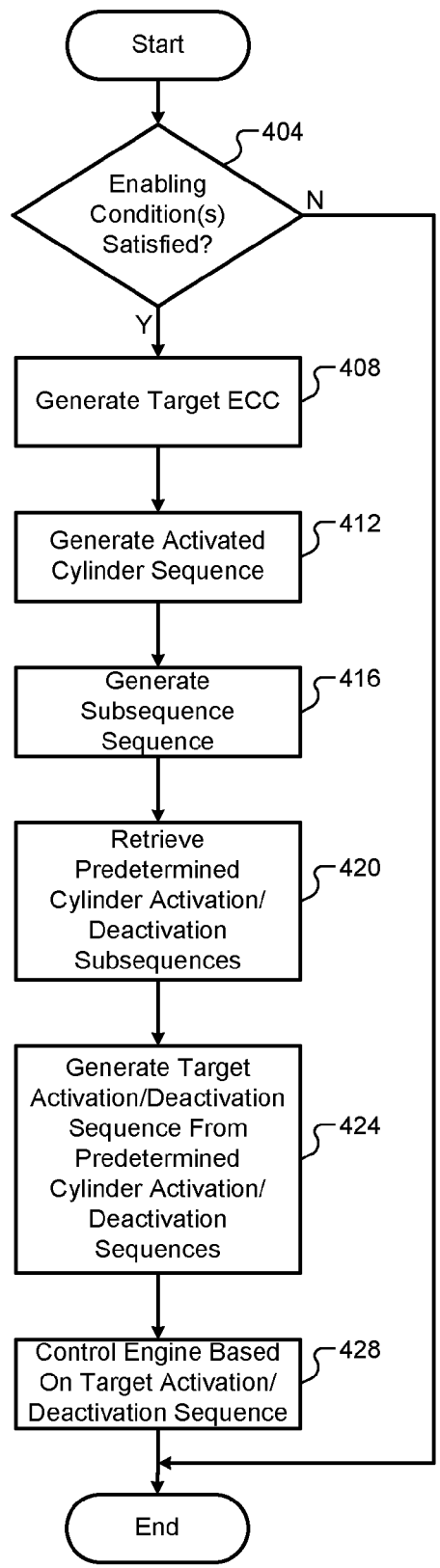
FIG. 4 is a flowchart depicting an example method of controlling cylinder activation and deactivation according to the present disclosure.

Referring now to FIG. 4, a flowchart depicting an example method of controlling cylinder activation and deactivation is presented. At 404, the cylinder control module 244 may determine whether one or more enabling conditions are satisfied. For example, the cylinder control module 244 may determine whether a steady-state or quasi steady-state operating condition is occurring at 404. If true, control may continue with 408. If false, control may end. A steady-state or a quasi steady-state operating condition may be said to be occurring, for example, when the engine speed 316 has changed by less than a predetermined amount (e.g., approximately 100-200 RPM) over a predetermined period (e.g., approximately 5 seconds). Additionally or alternatively, the throttle opening 320 and/or one or more other suitable parameters may be used to determine whether a steady-state or a quasi steady-state operating condition is occurring.

At 408, the target cylinder count module 304 generates the target ECC 308. The target cylinder count module 304 may determine the target ECC 308 based on the torque request 208 and/or one or more other parameters, as discussed above. The target ECC 308 may correspond to a target number of cylinders to be activated per engine cycle on average over the next N engine cycles.

The first sequence setting module 310 generates the activated cylinder sequence 312 at 412. The first sequence setting module 310 determines the activated cylinder sequence 312 based on the target ECC 308 and/or one or more other parameters, as discussed above. The activated cylinder sequence 312 includes a sequence of N integers that may correspond to the number of cylinders that should be activated during the next N engine cycles, respectively.

The subsequence setting module 332 generates the sequence of subsequences 336 at 416. The subsequence setting module 332 determines the sequence of subsequences 336 based on the activated cylinder sequence 312, the engine speed 316, and/or one or more other parameters, as discussed above. The sequence of subsequences 336 includes N indicators of N predetermined cylinder activation/deactivation subsequences to be used to achieve the corresponding numbers of activated cylinders indicated by the activated cylinder sequence 312.

At 420, the second sequence setting module 344 retrieves the predetermined cylinder activation/deactivation subsequences indicated by the sequence of subsequences 336. The second sequence setting module 344 retrieves the predetermined cylinder activation/deactivation subsequences from the subsequence database 340. Each of the predetermined cylinder activation/deactivation subsequences may include a sequence for activating and deactivating cylinders during one of the next N engine cycles.

At 424, the second sequence setting module 344 generates the target cylinder activation/deactivation sequence 248 based on the retrieved, predetermined cylinder activation/deactivation subsequences. More specifically, the second sequence setting module 344 assembles the retrieved, predetermined cylinder activation/deactivation sequences, in the order of indicated by the sequence of subsequences 336, to generate the target cylinder activation/deactivation sequence 248. In this manner, the target cylinder activation/deactivation sequence 248 may include a sequence for activating and deactivating cylinders during the next N engine cycles.

The engine 102 is controlled based on the target cylinder activation/deactivation sequence 248 at 428. For example, if the target cylinder activation/deactivation sequence 248 indicates that the next cylinder in the firing order should be activated, the following cylinder in the firing order should be deactivated, and the following cylinder in the firing order should be activated, then the next cylinder in the predetermined firing order is activated, the following cylinder in the predetermined firing order is deactivated, and the following cylinder in the predetermined firing order is activated.

The cylinder control module 244 deactivates opening of the intake and exhaust valves of cylinders that are to be deactivated. The cylinder control module 244 allows opening and closing of the intake and exhaust valves of cylinders that are to be activated. The fuel control module 232 provides fuel to cylinders that are to be activated and halts fueling to cylinders that are to be deactivated. The spark control module 224 provides spark to cylinders that are to be activated. The spark control module 224 may halt spark or provide spark to cylinders that are to be deactivated. While control is shown as ending, FIG. 4 is illustrative of one control loop, and a control loop may be executed, for example, every predetermined amount of crankshaft rotation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A cylinder control system of a vehicle, comprising:
a target cylinder count module that determines a target number of cylinders of an engine to be activated during a future period,
wherein the future period includes N sub-periods and N is an integer greater than or equal to two;
a first sequence setting module that, when a change in the target number is less than a predetermined value:
retrieves M predetermined percentages for M predetermined sequences for activating and deactivating cylinders of the engine, respectively, wherein M is an integer greater than or equal to two, respectively; and,
generates a sequence indicating N target numbers of cylinders to be activated during the N sub-periods, respectively, based on use of the M predetermined sequences in proportion to the M predetermined percentages, respectively;

a second sequence setting module that retrieves the M predetermined sequences for activating and deactivating cylinders of the engine, and that generates a target sequence for activating and deactivating cylinders of the engine during the future period using the M predetermined sequences in order according to the sequence indicating N target numbers of cylinders to be activated during the N sub-periods; and a cylinder actuator module that, during the future period:

activates opening of intake and exhaust valves of first ones of the cylinders that are to be activated based on the target sequence; and deactivates opening of intake and exhaust valves of second ones of the cylinders that are to be deactivated based on the target sequence.

2. The cylinder control system of claim 1 further comprising a fuel actuator module that provides fuel to the first ones of the cylinders and that halts fueling to the second ones of the cylinders.

3. The cylinder control system of claim 1 wherein the target cylinder count module determines the target number of cylinders to be activated during the future period based on an engine torque request.

4. The cylinder control system of claim 3 wherein the target cylinder count module sets the target number of cylinders to be activated during the future period to an average number of cylinders to be activated during the future period.

5. The cylinder control system of claim 1 wherein the sub-periods each correspond to a predetermined amount of crankshaft rotation.

6. The cylinder control system of claim 1 wherein the target number is a non-integer that is between zero and a maximum number of cylinder events that occur during a sub-period.

7. The cylinder control system of claim 1 wherein the first sequence setting module generates the sequence indicating the N target numbers of cylinders to be activated during the N sub-periods, respectively, further based on an engine speed.

8. The cylinder control system of claim 1 wherein the first sequence setting module generates the sequence indicating the N target numbers of cylinders to be activated during the N sub-periods, respectively, further based on a throttle opening.

9. A cylinder control method of a vehicle, comprising:

determining a target number of cylinders of an engine to be activated during a future period, wherein the future period includes N sub-periods and N is an integer greater than or equal to two;

when a change in the target number is less than a predetermined value:

retrieving M predetermined percentages for M predetermined sequences for activating and deactivating cylinders of the engine, respectively, wherein M is an integer greater than or equal to two, respectively; and generating a sequence indicating N target numbers of cylinders to be activated during the N sub-periods, respectively, based on use of the M predetermined sequences in proportion to the M predetermined percentages, respectively;

retrieving the M predetermined sequences for activating and deactivating cylinders of the engine;

generating a target sequence for activating and deactivating cylinders of the engine during the future period using the M predetermined sequences in order according to the sequence indicating N target numbers of cylinders to be activated during the N sub-periods, respectively; and during the future period:

activating opening of intake and exhaust valves of first ones of the cylinders that are to be activated based on the target sequence; and deactivating opening of intake and exhaust valves of second ones of the cylinders that are to be deactivated based on the target sequence.

10. The cylinder control method of claim 9 further comprising:

providing fuel to the first ones of the cylinders; and halting fueling to the second ones of the cylinders.

11. The cylinder control method of claim 9 further comprising determining the target number of cylinders to be activated during the future period based on an engine torque request.

12. The cylinder control method of claim 11 further comprising setting the target number of cylinders to be activated during the future period to an average number of cylinders to be activated during the future period.

13. The cylinder control method of claim 9 wherein the sub-periods each correspond to a predetermined amount of crankshaft rotation.

14. The cylinder control method of claim 9 wherein the target number is a non-integer that is between zero and a maximum number of cylinder events that occur during a sub-period.

15. The cylinder control method of claim 9 further comprising generating the sequence indicating the N target numbers of cylinders to be activated during the N sub-periods, respectively, further based on an engine speed.

16. The cylinder control method of claim 9 further comprising generating the sequence indicating the N target numbers of cylinders to be activated during the N sub-periods, respectively, further based on a throttle opening.

* * * * *